(12) United States Patent
Aramaki et al.

(10) Patent No.: US 12,224,086 B2
(45) Date of Patent: Feb. 11, 2025

(54) WIRING MEMBER AND LAMINATED SHEET

(71) Applicants: AutoNetworks Technologies, Ltd., Mie (JP); Sumitomo Wiring Systems, Ltd., Mie (JP); SUMITOMO ELECTRIC INDUSTRIES, LTD., Osaka (JP)

(72) Inventors: Miyu Aramaki, Mie (JP); Housei Mizuno, Mie (JP); Daichi Fukushima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 684 days.

(21) Appl. No.: 17/263,718

(22) PCT Filed: Jul. 19, 2019

(86) PCT No.: PCT/JP2019/028488
§ 371 (c)(1),
(2) Date: Jan. 27, 2021

(87) PCT Pub. No.: WO2020/031662
PCT Pub. Date: Feb. 13, 2020

(65) Prior Publication Data
US 2021/0202127 A1    Jul. 1, 2021

(30) Foreign Application Priority Data
Aug. 6, 2018    (JP) ................................ 2018-147372

(51) Int. Cl.
*H01B 7/00* (2006.01)
*B32B 3/10* (2006.01)
(Continued)

(52) U.S. Cl.
CPC ................. *H01B 7/00* (2013.01); *B32B 3/10* (2013.01); *B32B 5/022* (2013.01); *B32B 27/12* (2013.01); *B32B 27/304* (2013.01)

(58) Field of Classification Search
CPC .. H01B 7/00; B32B 5/022; B32B 3/10; B32B 27/12; B32B 27/304
(Continued)

(56) References Cited

U.S. PATENT DOCUMENTS

| 5,393,929 A | 2/1995 | Yagihashi |
| 10,734,134 B2 | 8/2020 | Mizuno et al. |

(Continued)

FOREIGN PATENT DOCUMENTS

| CN | 101218652 | 7/2008 |
| CN | 101586008 | 11/2009 |

(Continued)

OTHER PUBLICATIONS

International Search Report issued in International Patent Application No. PCT/JP2019/028488, dated Sep. 10, 2019.
(Continued)

*Primary Examiner* — Tremesha W Burns
(74) *Attorney, Agent, or Firm* — Greenblum & Bernstein, P.L.C.

(57) ABSTRACT

A wiring member includes: a wire-like transmission member (for example, an electric wire); a first sheet member including one main surface to which the wire-like transmission member is fixed; and a second sheet member fixed to the first sheet member on a side of another main surface of the first sheet member. The first sheet member is suitable for fixing of the wire-like transmission member in comparison to the second sheet member. One member of the first sheet member and the second sheet member includes a space into which another member being melted can be filled. The first sheet (Continued)

member and the second sheet member overlap each other with the another member out of the first sheet member and the second sheet member being melted, filled and then solidified in the space of the one member.

6 Claims, 5 Drawing Sheets

(51) Int. Cl.
  *B32B 5/02* (2006.01)
  *B32B 27/12* (2006.01)
  *B32B 27/30* (2006.01)
(58) Field of Classification Search
  USPC .................................................. 174/681.1
  See application file for complete search history.

(56) References Cited

U.S. PATENT DOCUMENTS

| | | |
|---|---|---|
| 2003/0159824 A1 | 8/2003 | Frederic et al. |
| 2009/0114415 A1 | 5/2009 | Morijiri |
| 2009/0291303 A1 | 11/2009 | Kopf et al. |
| 2011/0165810 A1 | 7/2011 | Mori et al. |
| 2014/0182892 A1* | 7/2014 | Hsu ..................... H05K 1/186 174/251 |
| 2016/0156165 A1 | 6/2016 | Katou et al. |
| 2020/0328008 A1 | 10/2020 | Mizuno et al. |

FOREIGN PATENT DOCUMENTS

| | | |
|---|---|---|
| CN | 105359362 | 2/2016 |
| DE | 10149975 | 11/2002 |
| DE | 102005013124 | 9/2006 |
| JP | 51-143088 | 12/1976 |
| JP | 51-159775 U | 12/1976 |
| JP | 58-192408 | 12/1983 |
| JP | 2-74337 | 3/1990 |
| JP | 6-312485 | 11/1994 |
| JP | 2003-285398 | 10/2003 |
| JP | 2009-73086 | 4/2009 |
| JP | 2010-259297 | 11/2010 |
| JP | 2012-130202 | 7/2012 |
| JP | 2014-189013 | 10/2014 |
| JP | 2016-95955 | 5/2016 |
| JP | 2017-205917 | 11/2017 |
| JP | 2018-68025 | 4/2018 |
| JP | 2018-85321 | 5/2018 |
| WO | 2006/117868 | 11/2006 |

OTHER PUBLICATIONS

Written Opinion issued in International Patent Application No. PCT/JP2019/028488, dated Sep. 10, 2019.
China Office Action issued in China Patent Application No. 201980051959.9, dated Nov. 30, 2021, together with English translation thereof.
Japan Office Action issued in Japan Patent Application No. 2020-30545, dated Jul. 5, 2022, together with English translation thereof.
Japan Office Action issued in Japan Patent Application No. 2020-30545, dated Dec. 13, 2022, together with English translation thereof.
Office Action issued in Japan Patent Application No. 2023-37636, dated Apr. 2, 2024, together with English translation thereof.
Office Action issued in German Patent Application No. 11 2019 003 964.4, dated Mar. 12, 2024, together with English translation thereof.
Office Action issued in Japan Patent Application No. 2023-37636, dated Aug. 27, 2024, together with English translation thereof.

* cited by examiner

WIRING MEMBER AND LAMINATED SHEET

TECHNICAL FIELD

The present disclosure relates to a wiring member and a laminated sheet.

BACKGROUND ART

Patent Document 1 discloses a configuration in which coated electric wires are arrayed on a soft resin sheet in parallel with each other. As a means for coupling the coated electric wires and the soft resin sheet, a heat pressure welding means and the like are disclosed.

PRIOR ART DOCUMENTS

Patent Documents

Patent Document 1: Japanese Utility Model Application Laid-Open No. 58-192408 (1983)

SUMMARY

Problem to be Solved by the Invention

It is preferable that a material suitable for coupling to the coated electric wires be selected as the soft resin sheet. For example, assume a case where the coated electric wires and the soft resin sheet are coupled to each other using the heat pressure welding means. In this case, it is preferable that a material to which the coating of the coated electric wires is easily welded be used as the soft resin sheet, such as the same resin as the resin material of the coating.

However, if a material suitable for coupling to the coated electric wires is selected for the soft resin sheet, the material may be inferior in other performance. In this case, such other performance may be supplemented by overlapping another sheet on the soft resin sheet.

However, depending on a combination of materials of the soft resin sheet and such another sheet or the like, both the sheets may not be able to be firmly fixed to each other in an overlapping manner.

In view of this, the present disclosure has an object to enable firm fixing of a second sheet member to a first sheet member to which an electric wire is fixed in an overlapping manner.

Means to Solve the Problem

A wiring member according to the present disclosure is a wiring member including: a wire-like transmission member; a first sheet member including one main surface to which the wire-like transmission member is fixed; and a second sheet member fixed to the first sheet member on a side of another main surface of the first sheet member. The first sheet member is suitable for fixing of the wire-like transmission member in comparison to the second sheet member. One member of the first sheet member and the second sheet member includes a space into which another member being melted can be filled. The first sheet member and the second sheet member overlap each other with the another member out of the first sheet member and the second sheet member being melted, filled and then solidified in the space of the one member.

A laminated sheet according to the present disclosure is a laminated sheet including: a first sheet member; and a second sheet member fixed to the first sheet member on a side of another main surface of the first sheet member. One member of the first sheet member and the second sheet member includes a space into which another member being melted can be filled. The first sheet member and the second sheet member overlap each other with the another member out of the first sheet member and the second sheet member being melted, filled and then solidified in the space of the one member.

Effects of the Invention

According to the present disclosure, the second sheet member can be firmly fixed to the first sheet member to which the electric wire is fixed in an overlapping manner.

DESCRIPTION OF EMBODIMENTS

Description of Embodiment of Present Disclosure

First, an embodiment of the present disclosure will be listed below.

A wiring member according to the present disclosure is as follows.

(1) A wiring member includes: a wire-like transmission member; a first sheet member including one main surface to which the wire-like transmission member is fixed; and a second sheet member fixed to the first sheet member on a side of another main surface of the first sheet member. The first sheet member is suitable for fixing of the wire-like transmission member in comparison to the second sheet member. One member of the first sheet member and the second sheet member includes a space into which another member being melted can be filled. The first sheet member and the second sheet member overlap each other with the another member out of the first sheet member and the second sheet member being melted, filled and then solidified in the space of the one member. The wire-like transmission member and the first sheet member can be firmly fixed to each other. Further, because the first sheet member and the second sheet member overlap each other with the melted another member being filled and then solidified in the space of the one member of the first sheet member and the second sheet member, the first sheet member and the second sheet member can be firmly fixed to each other in an overlapping manner.

(2) A melting point of the one member out of the first sheet member and the second sheet member may be higher than a melting point of the another member. When the overlapping first sheet member and second sheet member are heated, the another member out of the first sheet member and the second sheet member is more likely to melt first. Accordingly, treatment can be easily performed so that the melted another member is filled and then solidified in the space of the one member of the first sheet member and the second sheet member.

(3) The first sheet member may be a sheet-like member with inside being uniformly filled. The second sheet member may be a nonwoven sheet member including a plurality of fibers and the space between the plurality of fibers. The first sheet member and the nonwoven sheet member may overlap each other with the first sheet member being melted being filled and then solidified in the space of the nonwoven sheet member. The wire-like transmission member can be easily stably fixed to the sheet-like first sheet member with its inside being uniformly filled. Further, because the first sheet member and the nonwoven sheet member overlap each other with the melted first sheet member being filled and then solidified in the space between the plurality of fibers of the nonwoven sheet member, the first sheet member and the nonwoven sheet member can be firmly maintained in the overlapping state.

(4) The first sheet member being melted may be filled and then solidified in the space of the nonwoven sheet member on a side of the first sheet member. The space may remain in a part of the nonwoven sheet member away from the first sheet member. Because the space remains in the part of the nonwoven sheet member away from the first sheet member, protective performance and soundproofing owing to the nonwoven sheet member can be achieved.

(5) The first sheet member may be made of resin of a type same as a type of resin of a coating of the wire-like transmission member. Because the first sheet member is made of resin of a type the same as the type of the resin of the coating of the wire-like transmission member, the coating of the wire-like transmission member can be easily firmly fixed to the first sheet member.

(6) A coating of the wire-like transmission member and the first sheet member may be made of resin containing polyvinyl chloride as a main component. The second sheet member may be made of resin less extensible than the resin of the first sheet member. The coating of the wire-like transmission member and the first sheet member can be easily fixed to each other. Further, because polyvinyl chloride is extensible, the overlapping first sheet member and second sheet member can be made less extensible by the second sheet member made of the resin less extensible than the resin of the first sheet member.

A laminated sheet according to the present disclosure is as follows.

(7) A laminated sheet includes: a first sheet member; and a second sheet member fixed to the first sheet member on a side of another main surface of the first sheet member. One member of the first sheet member and the second sheet member includes a space into which another member being melted can be filled. The first sheet member and the second sheet member overlap each other with the another member out of the first sheet member and the second sheet member being melted, filled and then solidified in the space of the one member. Because the first sheet member and the second sheet member overlap each other with the melted another member being filled and then solidified in the space of the one member of the first sheet member and the second sheet member, the first sheet member and the second sheet member can be firmly fixed to each other in an overlapping manner. Further, the first sheet member and the second sheet member can overlap each other regardless of the quality of the adhesive property due to chemical interaction. Therefore, for example, a material suitable for fixing of another member can be used for the first sheet member, and the second sheet member can be configured to be suitable for securing of another function.

Details of Embodiment of Present Disclosure

Specific examples of a wiring member and a laminated sheet according to the present disclosure will be described below with reference to the drawings. Note that the present disclosure is not limited to these examples, and is recited in Claims and intended to include all of the modifications made within the scope of Claims and its equivalent meanings.

EMBODIMENT

A wiring member and a laminated sheet according to the embodiment will be described below.

Figure 1:
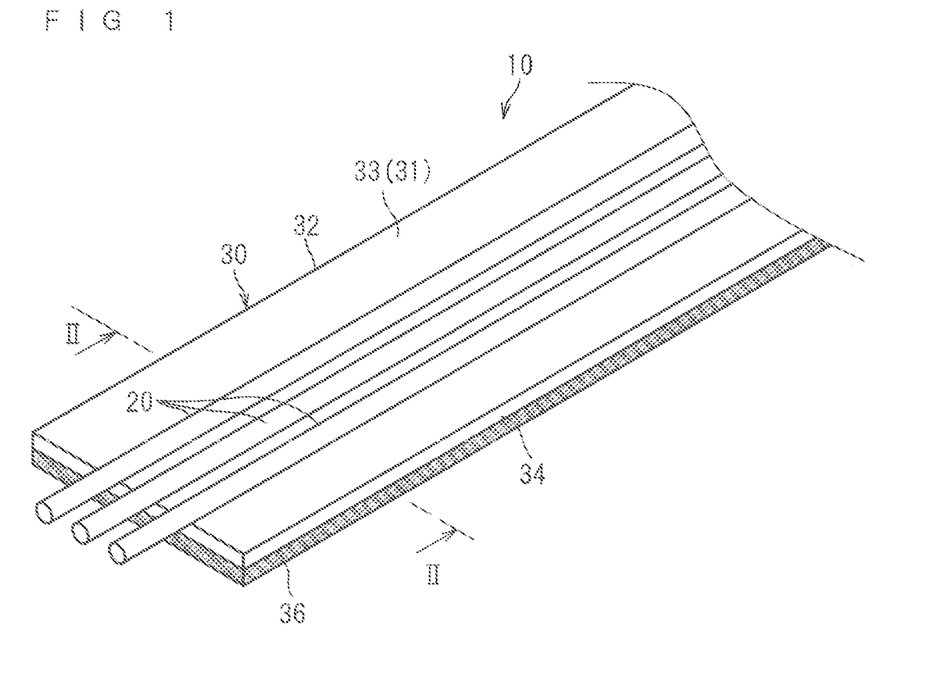
FIG. 1 is a schematic perspective view illustrating a wiring member according to an embodiment.
Figure 2:
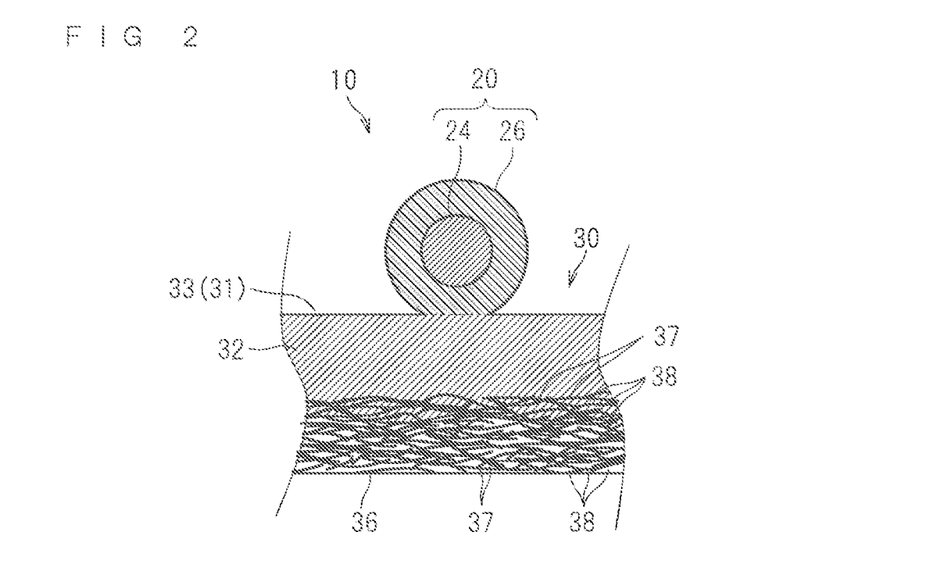
FIG. 2 is a partial cross-sectional diagram taken along the line II-II of FIG. 1.

FIG. 1 is a schematic perspective view illustrating a wiring member 10, and FIG. 2 is a partial cross-sectional diagram taken along the line II-II of FIG. 1.

The wiring member 10 includes a wire-like transmission member 20 and a laminated sheet 30. The laminated sheet 30 has a configuration in which a first sheet member 32 and a second sheet member 36 are laminated.

It is only necessary that the wire-like transmission member 20 be a wire-like member that transmits electricity, light, or the like. For example, the wire-like transmission member 20 may be a general electric wire including a core wire and a coating around the core wire, or may be a shield wire, an enameled wire, a nichrome wire, an optical fiber, or the like. As the wire-like transmission member that transmits electricity, various signal lines and various power lines may be used. The wire-like transmission member that transmits electricity may be used as an antenna, a coil, or the like that transmits or receives a signal or power to or from a space.

The following description herein will be given on the assumption that the wire-like transmission member 20 is the general electric wire 20 (hereinafter simply referred to as an electric wire 20). The electric wire 20 includes a core wire 24 as a transmission line main body, and an insulating coating 26 as the coating 26 that covers the core wire 24. Each description related to the electric wire 20 can be applied to each example of the wire-like transmission member 20, except for a configuration to which the description cannot be applied.

The core wire 24 includes one or a plurality of element wires. The element wires are made of a conductor, such as copper, a copper alloy, aluminum, and an aluminum alloy. When the core wire 24 includes a plurality of element wires, the plurality of element wires may be twisted together. The insulating coating 26 is formed by a resin material, such as polyvinyl chloride (PVC) and polyethylene (PE), being extruded around the core wire 24, for example. Here, the electric wire 20 is a so-called circular electric wire, with its horizontal cross-section having a circular shape.

Here, a plurality of (in FIG. 1, three) electric wires 20 being parallel with each other are fixed to the laminated sheet 30. There may be only one electric wire 20, or may be a plurality of electric wires 20. The electric wires 20 may be fixed on the laminated sheet 30 in a bending manner. The plurality of electric wires 20 may be fixed to the laminated sheet 30 in a manner of branching halfway.

The laminated sheet 30 is a sheet-like member, which has a main surface 31 on which the electric wires 20 are fixed. When the electric wires 20 are fixed on the main surface 31 of the laminated sheet 30, the electric wires 20 are held along a predetermined path on the main surface 31. The laminated sheet 30 may have flexibility that allows the laminated sheet 30 to be easily bent, or may be a member having such rigidity as to allow the laminated sheet 30 to remain in a certain shape.

The laminated sheet 30 has a configuration in which the first sheet member 32 and the second sheet member 36 are laminated.

The first sheet member 32 is a sheet-like member. Here, the first sheet member 32 is formed into an elongated rectangular shape. The electric wires 20 are fixed to one main surface 33 of the first sheet member 32.

The second sheet member 36 is a sheet-like member. Here, the first sheet member 32 is formed into an elongated rectangular shape. The second sheet member 36 is fixed to another main surface 34 of the first sheet member 32, so that the second sheet member 36 overlaps the another main surface 34.

Here, the first sheet member 32 and the second sheet member 36 have the same shape, and the second sheet member 36 is fixed to the entire another main surface 34 of the first sheet member 32. The first sheet member may be larger than the second sheet member, so that the second sheet member is fixed to a part of the another main surface of the first sheet member. In contrast, the first sheet member may be smaller than the second sheet member, so that the first sheet member is fixed to a part of the one main surface of the second sheet member.

Because the electric wires 20 are fixed to the first sheet member 32, the first sheet member 32 is arranged to be a member that is suitable for fixing of the electric wires 20 in comparison to the second sheet member 36.

When a member suitable for fixing of the electric wires 20 is adopted as the first sheet member 32, however, some function may become insufficient or deficient. In view of this, such some function of the first sheet member 32 is supplemented or provided using the second sheet member 36.

As the mode of fixing the electric wires 20 to the first sheet member 32, contact part fixing may be used, non-contact part fixing may be used, or both of the modes may be used at the same time.

Here, the contact part fixing is a mode in which the wire-like transmission member (electric wires 20) and the first sheet member 32 are fixed to each other with their contact parts being bonded to each other. Further, the non-contact part fixing is a fixing mode other than the contact part fixing, and is a mode in which, for example, the wire-like transmission member (electric wires 20) and the first sheet member 32 are maintained to be fixed to each other with another fixing member pressing the wire-like transmission member (electric wires 20) onto the first sheet member 32, for example.

As the mode of the contact part fixing, contact part indirect fixing may be used, contact part direct fixing may be used, or both of the modes may be used at the same time in different areas. Here, the contact part indirect fixing is a mode in which the wire-like transmission member (electric wires 20) and the first sheet member 32 are indirectly bonded and fixed to each other with the use of an interposing member, such as an adhesive, a pressure sensitive adhesive, and a double-sided adhesive tape that is provided between the wire-like transmission member and the first sheet member 32. Further, the contact part direct fixing is a mode in which the wire-like transmission member (electric wires 20) and the first sheet member 32 are directly bonded and fixed to each other without the use of a separately provided adhesive or the like. In the contact part direct fixing, for example, the wire-like transmission member (electric wires 20) and the first sheet member 32 may be bonded and fixed to each other with a resin contained in at least one of the wire-like transmission member (electric wires 20) and the first sheet member 32 being melted.

When such a state of contact part direct fixing is formed, for example, the resin may be melted with heat, or may be melted with a solvent. In other words, the state of contact part direct fixing may be a state of contact part direct fixing achieved with heat, or may be a state of contact part direct fixing achieved with a solvent. It is preferable that the state of contact part direct fixing be the state of contact part direct fixing achieved with heat.

In this case, the means of forming the state of contact part direct fixing is not specifically limited, and various means including publicly known means such as welding, fusion, and fusion welding may be used. For example, when the state of contact part direct fixing achieved with heat is formed with welding, various welding means such as ultrasonic welding, heat pressure welding, hot air welding, and high frequency welding can be adopted. Further, when the state of contact part direct fixing is formed with these means, the wire-like transmission member (electric wires 20) and the first sheet member 32 are in a state of contact part direct fixing achieved with the means. Specifically, for example, when the state of contact part direct fixing is formed with ultrasonic welding, the wire-like transmission member (electric wires 20) and the first sheet member 32 are in a state of contact part direct fixing achieved with ultrasonic welding. A part at which the state of contact part direct fixing achieved with heat is formed with welding (fixing part between the wire-like transmission member (electric wires 20) and the first sheet member 32) may be referred to as a welding part, and of the part, a fixing part achieved with ultrasonic welding may be referred to as an ultrasonic welding part and a fixing part achieved with heat pressure welding may be referred to as a heat pressure welding part, for example.

In a case of the contact part direct fixing, only the resin contained in the coating of the wire-like transmission member (electric wires 20) may be melted, or only the resin contained in the first sheet member 32 may be melted. In these cases, the melted resin of one member may be bonded to an outer surface of the other member to be solidified, which may result in formation of a relatively clear interface. Further, in a case of the contact part direct fixing, both of the resin contained in the coating of the wire-like transmission member (electric wires 20) and the resin contained in the first sheet member 32 may be melted. In this case, both of the resins may be mixed together, which may not result in formation of a clear interface. In particular, for example, when the coating of the wire-like transmission member (electric wires 20) and the first sheet member 32 contain resins that are relatively highly compatible to each other, such as when the same resin material is used, a clear interface may not be formed due to mixing of both of the resins.

As the mode of the non-contact part fixing, for example, the wire-like transmission member (electric wires) and the sheet member may be maintained to be fixed to each other with a thread, another sheet member, an adhesive tape, or the like pressing the wire-like transmission member (electric wires 20) onto the first sheet member 32, for example.

On the premise of each fixing mode described above, the significance that the first sheet member 32 is arranged to be a member suitable for fixing of the electric wires 20 in comparison to the second sheet member 36 may lie in the following, for example.

As a mode of the contact part indirect fixing being an example of the contact part fixing, consider a mode in which the wire-like transmission member (electric wires 20) and the first sheet member 32 are adhesively fixed to each other with an adhesive member such as a pressure sensitive adhesive and a double-sided adhesive tape that is provided between the wire-like transmission member and the first sheet member 32. In this case, based upon the description that the first sheet member 32 is a member suitable for fixing of the electric wires 20 in comparison to the second sheet member 36, it may be interpreted that an adhesive force with respect to the first sheet member 32 is larger than an adhesive force with respect to the second sheet member 36 when the adhesive member is applied to the first sheet member 32 and the second sheet member 36. In general, the adhesive member has a mall adhesive force with respect to a member that has a surface in which fine structures are externally present in a separable manner, such as a rough surface and nonwoven fabrics.

As a mode of the contact part indirect fixing being an example of the contact part fixing, consider a mode in which the wire-like transmission member (electric wires 20) and the first sheet member 32 are fixed to each other with an adhesive that is provided between the wire-like transmission member and the first sheet member 32. In this case, it may be interpreted that the first sheet member 32 has a larger adhesive force than the second sheet member 36 with respect to the adhesive suitable for adhesion of the wire-like transmission member (electric wires 20). In general, the adhesive exhibits a satisfactory adhesive property with respect to a member having satisfactory compatibility (affinity), and in particular, exhibits a satisfactory adhesive property with respect to resin of the same type. Therefore, it is sufficient that the coating of the wire-like transmission member (electric wires 20) and the first sheet member 32 be made of resin of the same type.

As a mode of the contact part direct fixing being an example of the contact part fixing, consider a mode in which the wire-like transmission member (electric wires 20) and the first sheet member 32 are fixed to each other with a resin surface of at least one of the members being melted and then solidified. As described above, the resin surface of at least one of the wire-like transmission member (electric wires 20) and the first sheet member 32 may be melted with heat, or may be melted with a solvent. In this case, it may be interpreted that a fixing force obtained when both of the wire-like transmission member (electric wires 20) and the first sheet member 32 are bonded to each other with at least one of the resin surface (coating) of the wire-like transmission member (electric wires 20) and the resin surface of the first sheet member 32 being melted and then solidified is larger than a fixing force obtained when both of the wire-like transmission member (electric wires 20) and the second sheet member 36 are bonded to each other with at least one of the resin surface (coating) of the wire-like transmission member (electric wires 20) and the resin surface of the second sheet member 36 being melted and then solidified. In general, if resin materials having satisfactory compatibility (affinity) are used, a satisfactory fixing force is obtained when at least one of the resin materials is melted, and in particular, a satisfactory fixing force is obtained when resin materials of the same type are used. Therefore, it is sufficient that a surface part (coating) of the wire-like transmission member (electric wires 20) and the first sheet member 32 be made of resin of the same type. In other words, it is sufficient that compatibility between the resin of the surface part of the wire-like transmission member and the resin of the first sheet member 32 be more satisfactory than compatibility between the resin of the surface part of the wire-like transmission member and the resin of the second sheet member 36.

As a mode of the non-contact part fixing, consider a mode in which, for example, a thread surrounds the wire-like transmission member (electric wires 20) to be sewed onto the first sheet member 32, such that the thread is used to sew the wire-like transmission member (electric wires 20) onto the first sheet member 32. In this case, it may be interpreted that the first sheet member 32 is less liable to be torn off by the thread than the second sheet member 36, and accordingly the wire-like transmission member (electric wires 20) that is sewed onto the first sheet member 32 using the thread is more firmly fixed than in a configuration in which the wire-like transmission member (electric wires 20) is sewed onto the second sheet member 36 using the same configuration.

As a mode of the non-contact part fixing, consider a mode in which the wire-like transmission member (electric wires 20) is fixed to the first sheet member 32 with a sheet member, an adhesive tape, or the like that covers the wire-like transmission member (electric wires 20) being fixed to the first sheet member 32. In this case, on the condition that another sheet member, an adhesive tape, or the like is fixed to the first sheet member 32 using an adhesive member, it may be interpreted that an adhesive force of the another sheet member, the adhesive tape, or the like with respect to the first sheet member 32 is larger than an adhesive force with respect to the second sheet member 36.

The above-described concept related to the fixing mode between the coating of the wire-like transmission member (electric wires 20) and the first sheet member 32 can be applied to each of a mode in which a pressing sheet member is fixed to the first sheet member 32 with an adhesive, a mode in which a pressing sheet member is fixed to the first sheet member 32 with a thread, and a mode in which a pressing sheet member is fixed with the resin surface of at least one of the sheet member and the first sheet member 32 being melted.

In summary, the description that the first sheet member 32 is suitable for fixing of the wire-like transmission member (electric wires 20) in comparison to the second sheet member 36 can be understood as follows: That is, provided that the wire-like transmission member (electric wires 20) is fixed to the first sheet member 32 and the second sheet member 36 using the same configuration, a fixing force of the wire-like transmission member (electric wires 20) with respect to the first sheet member 32 is larger than a fixing force of the wire-like transmission member (electric wires 20) with respect to the second sheet member 36.

The following description herein will be given by taking an example in which the wire-like transmission member (electric wires 20) is fixed to the first sheet member 32 by means of the contact part direct fixing, more specifically, the wire-like transmission member (electric wires 20) is fixed to the first sheet member 32 with the resin surface of at least one of the wire-like transmission member (electric wires 20) and the first sheet member 32 being melted and then solidified.

In this case, as described above, it may be interpreted that a fixing force obtained when both of the wire-like transmission member (electric wires 20) and the first sheet member 32 are bonded to each other with at least one of the resin surface (coating) of the wire-like transmission member (electric wires 20) and the resin surface of the first sheet member 32 being melted and then solidified is larger than a fixing force obtained when both of the wire-like transmission member (electric wires 20) and the second sheet member 36 are bonded to each other with at least one of the resin surface (coating) of the wire-like transmission member (electric wires 20) and the resin surface of the second sheet member 36 being melted and then solidified.

As long as the above-described condition is satisfied, a material constituting the first sheet member 32 is not specifically limited, and for example, the first sheet member 32 may be made of a material containing resin such as polyvinyl chloride (PVC), polyethylene terephthalate (PET), and polypropylene (PP). It is only necessary that a suitable material be selected depending upon a relationship with a material of the resin surface (coating) of the wire-like transmission member (electric wires 20).

As described above, it is sufficient that the resin surface (coating) of the wire-like transmission member (electric wires 20) and the first sheet member 32 be made of resin of the same type. For example, when the coating 26 of the electric wires 20 is made of resin containing polyvinyl chloride (PVC) as a main component, it is sufficient that the first sheet member 32 be made of resin containing polyvinyl chloride (PVC) as a main component.

Further, here, the first sheet member 32 is a sheet-like member with its inside being uniformly filled.

As described above, if the material of the first sheet member 32 is selected from the viewpoint of suitability of fixing of the electric wires 20, some function deemed desirable as the wiring member may be insufficient, or such some function may be deficient.

For example, as described above, consider a case where the first sheet member 32 is made of resin containing polyvinyl chloride (PVC) as a main component, in accordance with the material of the coating 26 of the electric wires 20. In this case, because polyvinyl chloride (PVC) is an extensible resin, polyvinyl chloride (PVC) may be unable to sufficiently receive a tensile force applied to the wiring member 10, with the result that the tensile force may significantly affect the electric wires 20 themselves.

In view of this, the second sheet member 36 is fixed to the first sheet member 32 in an overlapping manner. The second sheet member 36 is selected with the intention of supplementing or providing the first sheet member 32 with some function, and therefore a member that is not suitable for fixing of the electric wires 20 may be selected. As for the first sheet member 32, a member suitable for fixing of the electric wires 20 is selected, which may result in unsuitability of fixing in a state in which the second sheet member 36 overlaps the first sheet member 32.

For example, as described above, as the first sheet member 32, a member made of resin containing polyvinyl chloride (PVC) as a main component is selected in accordance with the material of the coating 26 of the electric wires 20. In this case, the first sheet member 32 is extensible, and thus it is sufficient that a member that is less extensible be selected as the second sheet member 36. For example, assume that the second sheet member 36 is made of less extensible resin such as polypropylene (PP), polyethylene terephthalate (PET), and polypropylene (PE).

Further, consider that both of the first sheet member 32 and the second sheet member 36 are fixed to each other by melting the resin surface of at least one of the members. In this case, the first sheet member 32 made of resin containing polyvinyl chloride (PVC) as a main component is not easily bonded to the second sheet member 36 made of resin such as polypropylene (PP), polyethylene terephthalate (PET), and polypropylene (PE), and both of the members may easily peel off.

In view of this, as the second sheet member 36, a member including a space in which the melted first sheet member 32 can be filled is used, and the first sheet member 32 and the second sheet member 36 are arranged to overlap each other with the melted first sheet member 32 being filled into the space of the second sheet member 36.

Here, as the second sheet member 36, a nonwoven sheet member is used. The nonwoven sheet member is a member formed into a sheet-like shape with a plurality of fibers 37 being entangled without being woven. When a resin that is less extensible than the resin constituting the first sheet member 32, such as polypropylene (PP), polyethylene terephthalate (PET), polyamide (PA), and polypropylene (PE), is used as the fibers 37, the nonwoven sheet member itself is also made less extensible. Thus, with the second sheet member 36 made of such a nonwoven sheet member being joined to the first sheet member 32 in an overlapping manner, the laminated sheet 30 itself is also made less extensible. The nonwoven sheet member may contain adhesive resin referred to as a binder. The adhesive resin has a melting point lower than a melting point of the fibers 37, and serves to bond the fibers 37 to each other. The adhesive resin may cover all or a part of the plurality of fibers, or may be mixed in a form of fibers or particles separately from the above-mentioned fibers.

In the second sheet member 36 made of the nonwoven sheet member, a space 38 is formed between the plurality of fibers 37. The space 38 is the space 38 into which the melted first sheet member 32 can be filled.

It is preferable that the melting point of the second sheet member 36 made of the nonwoven sheet member be set higher than the melting point of the first sheet member 32. Specifically, in order that the melted first sheet member 32 is filled into the space 38 of the second sheet member 36 made of the nonwoven sheet member, it is preferable that the space 38 remain uncollapsed when the first sheet member 32 is melted. To achieve this, it is sufficient that the melting point of the fibers 37 of the second sheet member 36 be set higher than the melting point of the first sheet member 32.

For example, the first sheet member 32 may be made of resin containing as a main component polyvinyl chloride (PVC) having a melting point of 85 to 210 degrees, and polypropylene (PP) having a melting point of approximately 250 degrees may be used as the fibers of the second sheet member 36.

Note that the melting point of the fibers 37 need not necessarily be higher than the melting point of the first sheet member 32. The melting point of the adhesive resin need not be higher than the melting point of the first sheet member 32. The melting point of the second sheet member 36 concerns a temperature of a main part (fibers 37) that forms the space 38.

Figure 3:
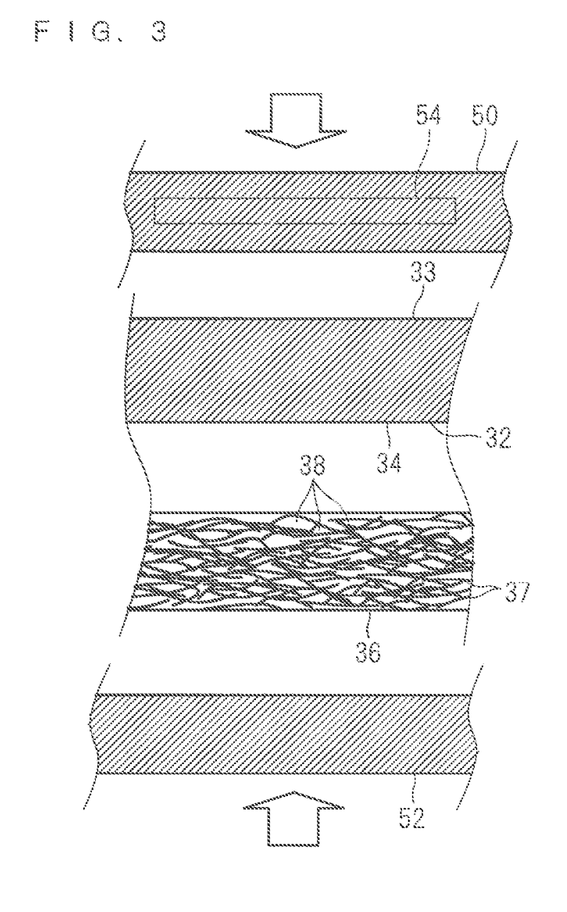
FIG. 3 is an explanatory diagram illustrating a process of manufacturing the wiring member.

For example, as illustrated in FIG. 3, the first sheet member 32 and the second sheet member 36 can be fixed to each other in an overlapping manner.

First, the first sheet member 32 and the second sheet member 36 are provided. Then, with the first sheet member 32 and the second sheet member 36 overlapping each other, a first press member 50 and a second press member 52 press the first sheet member 32 and the second sheet member 36 therebetween. A heater 54 is provided on at least one of the first press member 50 and the second press member 52. It is sufficient that the heater 54 be provided at least on the first press member 50 side, which is the side to press the first sheet member 32, mainly with the intention of enabling heating of the first sheet member 32.

When the first press member 50 and the second press member 52 pressurize and heat the first sheet member 32 and the second sheet member 36 overlapping each other, at least a part of the first sheet member 32 is melted. Then, the melted part of the first sheet member 32 flows into the space 38 of the fibers 37 of the second sheet member 36, so as to be filled into the space 38.

When the heating stops afterwards, the part of the first sheet member 32 that has been melted and filled into the space 38 is solidified, causing the first sheet member 32 and the second sheet member 36 to be fixed to each other in an overlapping manner.

When the first sheet member 32 is heated, the entire first sheet member 32 may be melted, or only a part thereof close to the second sheet member 36 may be melted. The melted part of the first sheet member 32 may be filled only into the space 38 of the second sheet member 36 on the first sheet member 32 side, or may be filled into the space 38 of the second sheet member 36 in the entire thickness direction. In FIG. 2, the melted first sheet member 32 is filled and solidified in the space 38 of the second sheet member 36 on the first sheet member 32 side, while at least a part of the space 38 remains in a part of the second sheet member 36 away from the first sheet member 32.

The first sheet member 32 and the second sheet member 36 may be fixed to each other on their entire contact surfaces, or may be fixed to each other at a partial fixing position or fixing area.

The fixing of the electric wires 20 to the first sheet member 32 may be implemented before the first sheet member 32 and the second sheet member 36 are fixed to each other, or may be implemented after the first sheet member 32 and the second sheet member 36 are fixed to each other. When the first sheet member 32 and the second sheet member 36 are fixed to each other after the electric wires 20 are fixed to the first sheet member 32, the first sheet member 32 and the second sheet member 36 may be pressurized and heated, avoiding the fixing positions of the electric wires 20.

The material, property, or the like of the second sheet member 36 differs depending on the function that is intended to be supplemented or provided for the first sheet member 32. For example, when soundproofing, cushioning property, and the like are intended to be supplemented or provided, a nonwoven sheet member made of extensible fibers may be used for the second sheet member 36. Further, for example, rigidity and the like are intended to be supplemented or provided, a sheet having rigidity higher than rigidity of the first sheet member 32 may be used for the second sheet member 36.

According to the wiring member 10 and the laminated sheet 30 configured as described above, the first sheet member 32 is a member suitable for fixing of the electric wires 20 in comparison to the second sheet member 36. Therefore, the electric wires 20 can be firmly fixed to the first sheet member 32.

Further, because the first sheet member 32 and the second sheet member 36 overlap each other with the melted first sheet member 32 being filled and then solidified in the space 38 of the second sheet member 36, owing to the anchor effect, the first sheet member 32 is fixed to the second sheet member 36 and peeling strength is enhanced, with the result that both of the members can be firmly fixed to each other in an overlapping manner. In other words, the first sheet member 32 and the second sheet member 36 are fixed to each other mainly due to a physical effect, thus allowing for selection of a member made of any material as the second sheet member 36 without consideration of a chemical fixing force or the like with respect to the electric wires 20 and the first sheet member 32, and easy provision or supplement of any function deemed desirable.

Further, when the melting point of the second sheet member 36 is set higher than the melting point of the first sheet member 32, the first sheet member 32 is easily melted with the space 38 remaining in the second sheet member 36, at the time when the overlapping first sheet member 32 and second sheet member 36 are pressurized and heated. Accordingly, fixing is easily achieved with the melted first sheet member 32 being filled and then solidified in the space 38 of the second sheet member 36. With this configuration, the first sheet member 32 and the second sheet member 36 can be more securely and firmly fixed to each other in an overlapping manner.

Further, because the first sheet member 32 is a sheet-like member with its inside being uniformly filled, the wire-like electric wires 20 can be stably fixed to the first sheet member 32. Further, because the second sheet member 36 is a nonwoven sheet member, a large number of spaces 38 are formed between the plurality of entangled fibers 37, and the melted first sheet member 32 is easily filled into the large number of spaces 38. Further, in this state, the plurality of fibers 37 are intricately embedded inside the melted first sheet member 32, making it difficult for the melted first sheet member 32 to be released from the space 38 between the plurality of fibers 37. Therefore, the first sheet member 32 and the second sheet member 36 can be firmly fixed to each other in an overlapping manner.

Further, the melted first sheet member 32 is filled and then solidified in the space of the second sheet member 36 being a nonwoven sheet member on the first sheet member 32 side, and the space 38 remaining in a part of the second sheet member 36 away from the first sheet member 32. Thus, protective performance and soundproof performance owing to the nonwoven sheet member can be achieved.

Further, when the resin material of the first sheet member 32 and the resin material (material of the coating 26) of the surface of the wire-like transmission member (electric wires 20) are made of resin of the same type, the surface (coating 26) of the wire-like transmission member (electric wires 20) can be easily firmly fixed to the first sheet member 32.

For example, when the surface part (coating 26 of the electric wires 20) of the wire-like transmission member and the first sheet member 32 are made of resin containing polyvinyl chloride as a main component, both of the members can be firmly fixed to each other. Further, when the second sheet member 36 is made of resin (for example, polypropylene (PP), polyethylene terephthalate (PET), polypropylene (PE), or the like being less extensible) that is less extensible than that of the first sheet member 32, the entire laminated sheet 30 can be made less extensible. Thus, when a tensile force is applied to the wiring member 10, the tensile force can be received in the laminated sheet 30, allowing the tensile force to be less liable to affect the electric wires 20.

{Modifications}

Based on the premise of the above embodiment, various modifications will be described.

The above embodiment has described an example in which the first sheet member 32 has a sheet-like member with its inside being uniformly filled, and the second sheet member 36 is a nonwoven sheet member.

Figure 4:
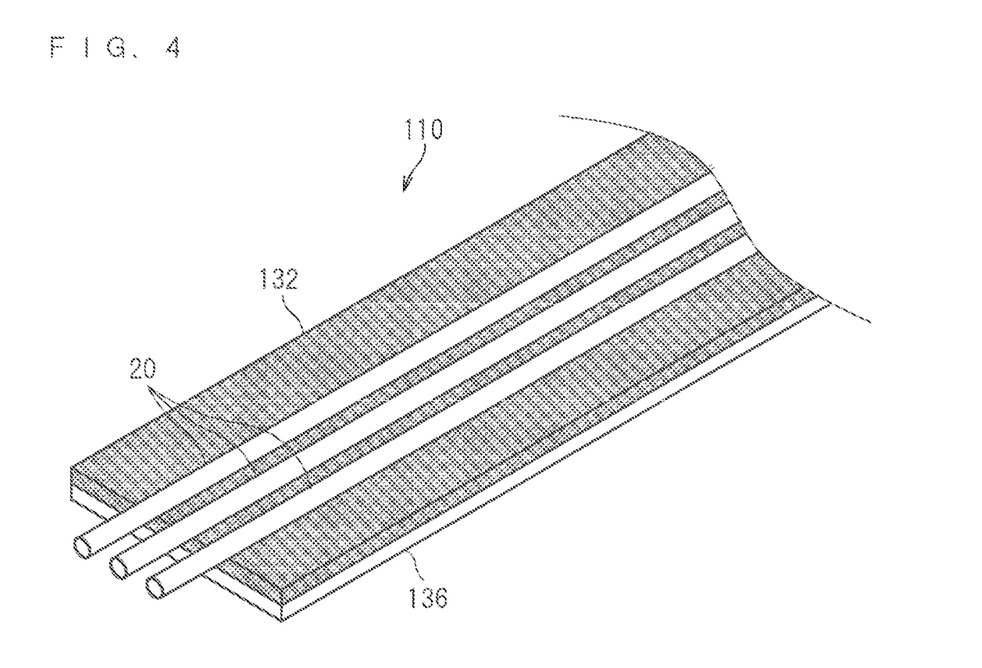
FIG. 4 is a schematic perspective view illustrating the wiring member according to a first modification.

In contrast, as in a wiring member 110 according to the first modification illustrated in FIG. 4, a first sheet member 132, to which the electric wires 20 are fixed, may be a nonwoven sheet member, and a second sheet member 136 may be a sheet-like member with its inside being uniformly filled. In this case as well, as long as the first sheet member 132 is suitable for fixing of the electric wires 20, the electric wires 20 can be firmly fixed to the first sheet member 132, and the first sheet member 132 and the second sheet member 136 can be firmly fixed to each other in an overlapping manner.

For example, with the coating 26 of the electric wires 20 and the first sheet member 132 being a nonwoven sheet member being made of resin materials of the same type such as polyvinyl chloride (PVC), both the coating 26 and the first sheet member 132 may be a combination suitable for fixing. Further, for example, the second sheet member 136 may be made of polypropylene (PP), polyethylene terephthalate (PET), polypropylene (PE), or the like being less extensible, such that less extensibility may be provided.

In other words, the first sheet member to which the electric wires are fixed may be a member including a space, and the melted second sheet member may be filled and then solidified in the space.

Further, the above embodiment has described an example in which the second sheet member 36 including the space 38 is a nonwoven sheet member. However, it is only necessary that the second sheet member be a member including a space in which the melted first sheet member can be filled and then solidified.

Figure 5:
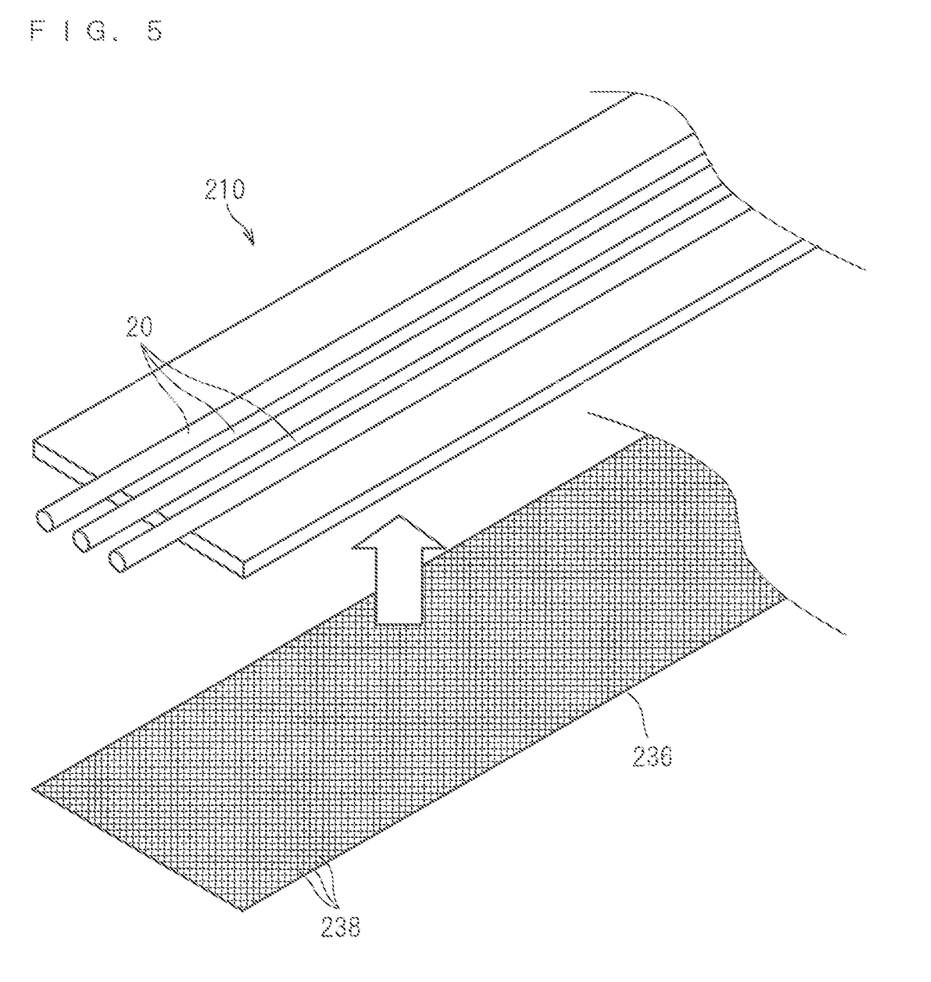
FIG. 5 is a schematic perspective view illustrating the wiring member according to a second modification.

For example, in a wiring member 210 according to the second modification illustrated in FIG. 5, a mesh member is used as a second sheet member 236. FIG. 5 illustrates a state before the second sheet member 236 is fixed to the first sheet member 32. The mesh second sheet member 236 includes a space 238 between vertically and horizontally combined wire-like members. In other words, the mesh serves as the space 238. The second sheet member 236 provides or supplements a function for the first sheet member 32, in a manner similar to the above embodiment. For example, the second sheet member 236 may be made of polypropylene (PP), polyethylene terephthalate (PET), polypropylene (PE), metal, or the like being less extensible.

Figure 6:
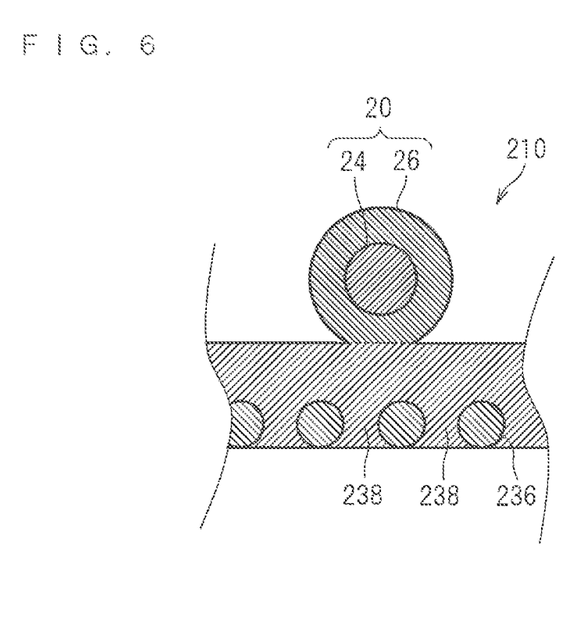
FIG. 6 is a partial cross-sectional diagram illustrating the wiring member according to the above modification.

Further, in a manner similar to the above embodiment, when the overlapping first sheet member 32 and second sheet member 236 are pressurized and heated, as illustrated in FIG. 6, the first sheet member 32 is melted, so as to be filled into the space 238 (mesh) of the second sheet member 236 and then solidified. Accordingly, the electric wires 20 can be firmly fixed to the first sheet member 32, and the first sheet member 32 and the second sheet member 236 can be firmly fixed to each other in an overlapping manner.

As the second sheet member, a sheet including a space may be sufficiently used. Other than the mesh as in the above description, woven fabrics obtained by vertically and horizontally combining threads, fabrics woven with threads, or the like may be used. The woven fabrics and mesh fabrics include a space between combined or woven threads, and thus the melted first sheet member can be filled and then solidified in the space. Further, another example of the second sheet member is a member in which holes penetrating in the front and the back of a sheet or a bottomed recess is formed, with an internal space of the holes or an internal space of the bottomed recess serving as a space in which the melted first sheet member is filled and then solidified.

Further, when the electric wires 20 and the first sheet member 32 are melted with heat to be fixed to each other, it is preferable that whether or not heat is sufficiently applied to the electric wires 20 and the first sheet member 32 so as to be firmly fixed to each other be able to be checked.

Figure 7:
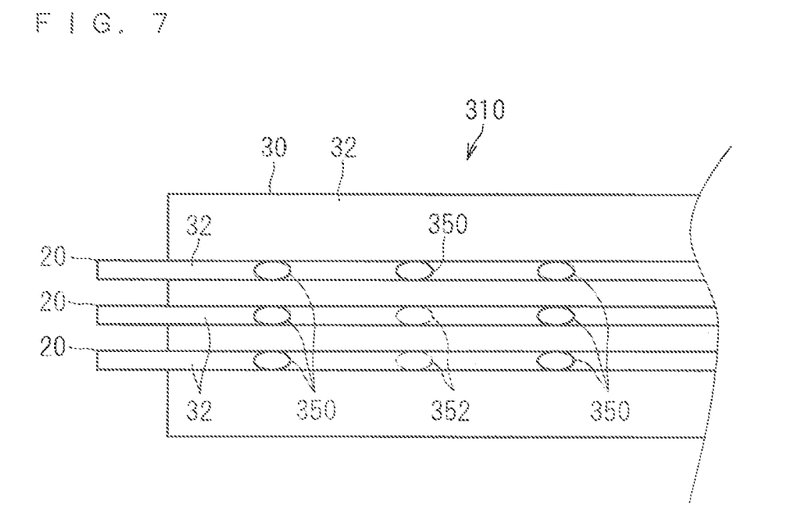
FIG. 7 is an explanatory diagram illustrating an example in which a material that changes its color due to heat is provided on the wiring member.

To achieve this, as in a wiring member 310 illustrated in FIG. 7, a material that changes its color due to heat may be provided on at least one of the first sheet member 32 being a sheet to which the electric wires 20 are fixed and the coating 26 (resin constituting the surface of the wire-like transmission member) of the electric wires 20. The material that changes its color due to heat may be mixed into the material for forming the first sheet member 32 or the coating 26, or may be caused to adhere to their surfaces.

It is preferable that the material that changes its color due to heat change its color at a predetermined temperature that is equal to or higher than a temperature at which a contact part between the electric wires 20 and the first sheet member 32 is supposed to be heated (for example, the lower temperature of the melting point of the electric wires 20 and the melting point of the first sheet member 32), when the electric wires 20 and the first sheet member 32 are fixed to each other with heat.

The material that changes its color due to heat may irreversibly change its color, or may reversibly change its color. In order to inspect whether or not heat is sufficiently applied to the electric wires 20 and the first sheet member 32 after a certain time period has elapsed from treatment, it is preferable that the material that changes its color due to heat irreversibly change its color. When the material that changes its color due to heat reversibly changes its color, it is sufficient that inspection be performed using an image processing inspection apparatus having a function of extracting color changed positions, which are extracted either visually or through capturing of a camera during or immediately after thermal treatment.

As the material that irreversibly changes its color, a material of a compound pigment containing cobalt, nickel, copper, or the like that changes its color through a change in composition due to pyrolysis or the like may be used. As such a material, for example, a material known as an irreversible thermoindicator paint may be used.

As the material that reversibly changes its color, a paint that utilizes physical changes such as transition of a crystal system of compound may be used. For example, a paint using Mercury(II) iodide acid salt or the like may be used. As such a material, for example, a material known as an irreversible thermoindicator paint (thermo color, Temp-Alarm, thermo paint, or the like) may be used.

According to the present example, when the electric wires 20 and the first sheet member 32 are fixed to each other with heat, positions 350 to which heat is sufficiently applied change their colors due to the heat. In contrast, positions 352 to which heat is insufficiently applied maintain their original colors, or the degree of color change thereof is low. Accordingly, the failure to achieve fixing with sufficiently applied heat can be visually checked.

In FIG. 7, the electric wires 20 are fixed to the first sheet member 32 at a plurality of positions at intervals. However, the electric wires 20 may be fixed to the first sheet member 32 across the entire longitudinal direction thereof.

The present configuration is not limited to being applied to the wiring member 10 described in the above embodiment, and can be widely applied to a case where the wire-like transmission member (electric wires 20) is fixed to the sheet-like member.

When a material that changes its color due to heat is provided on at least one of the first sheet member 32 and the second sheet member 36 and both of the members are fixed to each other, whether or not the heat is applied to desired positions or areas may be able to be inspected.

Note that each configuration described in the above embodiment and each modification can be combined as appropriate as long as the combination remains consistent. For example, the first modification and the second modification may be combined, such that a mesh member is used as the first sheet member to which the electric wires 20 are fixed, and a sheet-like member with its inside being uniformly filled is used as the second sheet member.

EXPLANATION OF REFERENCE SIGNS

10 Wiring member
20 Wire-like transmission member (electric wire)
24 Core wire
26 Insulating coating
30 Laminated sheet
31 Main surface
32 First sheet member
33 One main surface
34 Another main surface
36 Second sheet member
37 Fiber
38 Space
50 First press member
52 Second press member
54 Heater
110 Wiring member
132 First sheet member
136 Second sheet member
210 Wiring member
236 Second sheet member
238 Space
310 Wiring member
350 Position
352 Position

The invention claimed is:

1. A wiring member comprising:
a wire-like transmission member, including a core wire and a coating surrounding an entire periphery of the core wire;
a first sheet member including one main surface to which the wire-like transmission member is fixed; and
a second sheet member fixed to the first sheet member on a side of another main surface of the first sheet member, wherein
the first sheet member is suitable for fixing of the wire-like transmission member in comparison to the second sheet member,
one sheet member of the first sheet member and the second sheet member includes a space, and the other sheet member of the first sheet member and the second sheet member is melted and filled into the space of the one sheet member, and
the first sheet member and the second sheet member overlap each other with the other sheet member being melted, filled and then solidified in the space of the one sheet member,
the first sheet member is made of resin of a type same as a type of resin of the coating of the wire-like transmission member, and
the coating of the wire-like transmission member is fixed to the one main surface of the first sheet member, with one of the first sheet member and the coating of the wire-like transmission member being melted and solidified.

2. The wiring member according to claim 1, wherein a melting point of the one sheet member is higher than a melting point of the other sheet member.

3. The wiring member according to claim 1, wherein
the first sheet member is a sheet-like member with inside being uniformly filled,
the second sheet member is a nonwoven sheet member including a plurality of fibers and the space between the plurality of fibers, and
the first sheet member and the nonwoven sheet member overlap each other with the first sheet member being melted being filled and then solidified in the space of the nonwoven sheet member.

4. The wiring member according to claim 3, wherein
the first sheet member being melted is filled and then solidified in the space of the nonwoven sheet member on a side of the first sheet member, and
the space remains in a part of the nonwoven sheet member away from the first sheet member.

5. The wiring member according claim 1, wherein
the coating of the wire-like transmission member and the first sheet member are made of resin containing polyvinyl chloride as a main component, and
the second sheet member is made of resin less extensible than the resin of the first sheet member.

6. A laminated sheet comprising:
a first sheet member; and
a second sheet member fixed to the first sheet member on a side of a main surface of the first sheet member, wherein
one sheet member of the first sheet member and the second sheet member includes a space, and the other sheet member of the first sheet member and the second sheet member is melted and filled into the space of the one sheet member,
the first sheet member and the second sheet member overlap each other with the other sheet member being melted, filled and then solidified in the space of the one sheet member, and
the second sheet member is a nonwoven sheet member including a plurality of fibers and adhesive resin having a melting point lower than a melting point of the fibers.

* * * * *